UNITED STATES PATENT OFFICE.

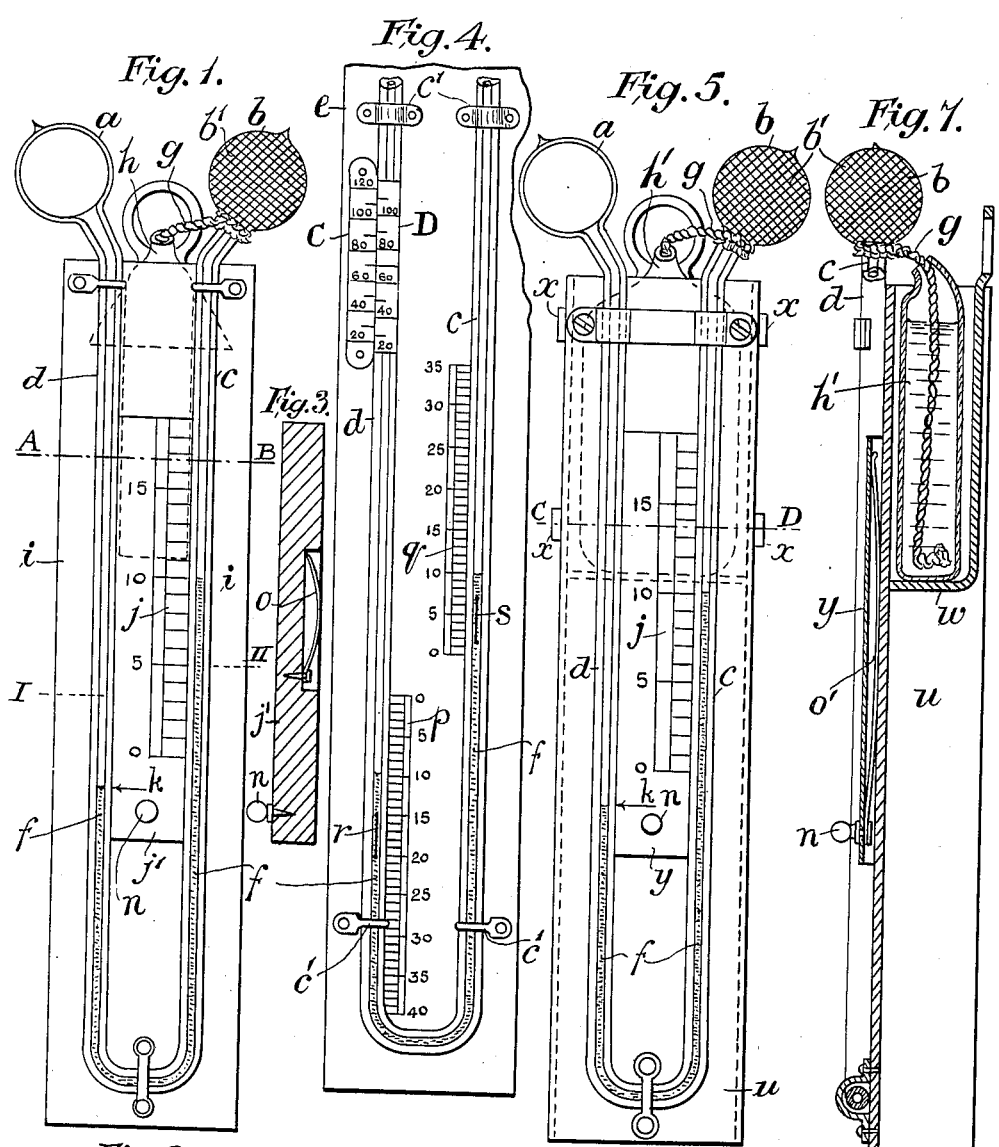

SAMUEL AUGUSTINE DE NORMANVILLE, OF EALING, ENGLAND.

HYGROMETER.

1,198,199.  Specification of Letters Patent.  Patented Sept. 12, 1916.

Application filed February 15, 1915. Serial No. 8,375.

*To all whom it may concern:*

Be it known that I, SAMUEL AUGUSTINE DE NORMANVILLE, a subject of the King of Great Britain, residing at Ealing, in the county of Middlesex, England, have invented certain new and useful Improvements in Hygrometers, of which the following is a specification.

This invention relates to improvements in wet and dry bulb hygrometers by means of which the degree of moisture in the atmosphere in rooms or outside may be estimated. Such instruments and their uses are well known. They usually comprise two separate thermometers mounted on a single stand. Their sole function is to show the difference in temperature or "depression" of the wet bulb thermometer as compared with the dry bulb thermometer at the same moment, and this difference is only obtained by reading two instruments and deducting one reading from the other.

The object of the present invention is to provide a hygrometer which will indicate this difference directly at one observation and which may readily be arranged to register the maximum and minimum differences since last inspection. With the usual Mason hygrometer this was impossible as even if registering thermometers were used there would be no evidence that the respective maxima and minima occurred at the same time, or that greater or less differences of temperature did not exist at some other moment. The measure of the degree of moisture is a function of the difference in temperature of the two thermometers at one moment and not a function of the actual maximum and minimum temperatures recorded. By means of this invention it is possible for the first time to get a direct registration of maximum or minimum "depression" of the wet bulb, or of both, in a single instrument.

According to this invention I employ a tube having two bulbs with air or gas therein, one at each end, and an indicating liquid between, one of said bulbs being a dry bulb and the other a wet bulb, and means are provided which by the surface or surfaces of the indicating liquid will give a direct indication or reading at one observation of the difference in temperature between the bulbs, or the so called "depression" of the wet bulb.

The invention also comprehends the provision of a hygrometer with a sliding scale or index according to this invention so as to obtain a scale with divisions of double width, and eliminate a small temperature error hereinafter referred to.

These and further features of this invention are hereinafter more specifically described and claimed.

Referring now to the accompanying drawings which illustrate this invention by way of example:—

Figure 1 is a front view of a hygrometer according to this invention. Fig. 2 is a section on the line A—B, Fig. 1. Fig. 3 is a separate sectional view of the sliding scale. Fig. 4 is a view showing part of an instrument as arranged for registering maximum and minimum degrees of "depression" of the wet bulb, and also showing means for enabling the instrument to be corrected to allow for the expansion of the indicating liquid due to changes of temperature. Fig. 5 is a front view of an instrument with a metal case. Fig. 6 is a section on the line C—D of Fig. 5 and Fig. 7 is a transverse vertical sectional elevation of the instrument shown in Fig. 5.

In carrying the invention into effect according to the form shown in Figs. 1 to 3, I use a differential thermometer comprising the dry bulb $a$, and the wet bulb $b$, connected by a U tube $c$, $d$, and mounted on a frame $e$. The bulbs $a$ and $b$ are filled with air or other suitable gas. In the connecting U tube $c$, $d$, there is provided a column of liquid $f$. Suitable liquid is almond oil colored with anchusu root or a pure petroleum oil of good limpidity and high evaporating point. In some cases sulfuric acid may be used in which case the finished tubes should be left some time before calibrating so that the acid may absorb the moisture in the air or gas contained in the bulbs $a$ and $b$. The wet bulb $b$ is surrounded by a suitable fabric $b'$ such as cotton or the like which has a wick $g$, leading into a receptable $h$, containing liquid. This receptacle, as can be seen from Fig. 2 is conveniently accommodated in the body of the frame $e$. The frame $e$ is conveniently provided with face pieces $i$, which act as guides for a sliding block $j'$, provided with a graduated face or scale $j$.

The instrument is so constructed that the liquid surfaces stand about half way up the legs $c$, $d$, of the U tube, and as nearly level as possible when both bulbs are dry and at the same temperature, such positions of the liquid surfaces in the form illustrated in Fig. 1 being about at the points I and II indicated by dotted lines. From these "zero" points a scale may be marked on either side or both sides, one of course reading downward and one upward as shown in Fig. 4. A reading may be taken from either scale. In practice, however, I prefer to use a movable scale such as the scale $j$, in Fig. 1, which measures the difference of level between the two surfaces, thus adding together the rise and fall and giving a scale with divisions of double width. The sliding block $j'$ bearing the scale $j$, is conveniently provided with an arrow $k$, on one side and graduations on the other side. The reason why the arrow $k$ is shown spaced away from the zero of the scale $j$ is that it is practically impossible to insure that the volumes of the air or gas in the bulbs $a$ and $b$ are such that after sealing up the bulbs the level of the liquid in the legs $d$ and $e$, is the same when both bulbs are dry. The displacement of the arrow point $k$ from the zero of the scale is made to correspond with the actual difference of level of the liquid in the two legs. The sliding block $j'$ may be provided with a knob $n$ and a friction spring $o$ for the purpose of holding the scale suspended in the position to which it has been moved. When the bulb $b$, is wetted and the liquid rises in $c$ a reading is taken by bringing the arrow point $k$ opposite the liquid surface in $d$ and reading from the other liquid surface against the scale. As drawn in Fig. 1 the instrument reads 10°, i. e. 10° of difference in temperature between the two bulbs. The sliding scale after taking an observation remains suspended in the position to which it has been moved and thus in virtue of the arrow $k$ forms a record of the position of the column of liquid at the last reading.

It will be seen that this instrument gives directly at one reading the difference in temperature between the wet bulb $b$ and the dry bulb $a$, that is to say, the "depression" of the wet bulb referred to as $t-t'$ in the hygrometric tables. This is effected irrespective of the actual temperatures and the instrument is thus the equivalent of the two thermometers in the ordinary hygrometer. With the help of the ordinary thermometer reading, the relative humidity is obtained from tables in the usual manner, but apart from relative humidity a continuous indication is given at one observation of the hygrometric condition of the air which is useful for various industrial and other purposes.

The zero positions are ascertained when both bulbs are dry and at the same temperature, preferably at an average temperature, say 70° F. At extreme air temperatures the expansion or contraction of the liquid itself will cause a slight displacement of these zero positions, causing slight errors, which will be plus on one side and minus on the other, but as a rule these two errors are not of such magnitude as to cause any appreciable difference in the reading and they will not affect the accuracy of the reading taken by the sliding scale $j$ in Fig. 1, as this measures not from any fixed point but from one liquid surface to the other.

When fixed scales are used, a table of corrections for various air temperatures may be supplied if great accuracy is necessary. The volume of liquid in the legs of the U tube $c$ $d$, however, is so small that the error due to this cause at ordinary air temperatures is not considerable.

It will be seen that with this instrument when the liquid level falls in the leg $d$, it rises in the leg $c$ an equal amount, so that the maximum fall in the leg $d$ will be concurrent with the maximum rise in the leg $c$. This enables the instrument to be readily used to "register" the maximum and minimum depression of the wet bulb. Fig. 4 shows a suitable arrangement of maximum and minimum instrument. In this case fixed scales $p$ and $q$ are provided and indices $r$ and $s$ are also provided in the separate legs. The index $r$ on the dry bulb side will register the maximum difference of temperature as these indices will be carried down with the liquid owing to the action of the surface tension on the face of the liquid as is well understood. In the same way index $s$ will be carried down with the column on the wet bulb side and will indicate the nearest position to zero which the two columns occupied and therefore the minimum difference in temperature between the wet and dry bulbs. The indices as drawn in Fig. 4 show a maximum "depression" of the wet bulb of about 15° and a minimum of 7°.

To correct the readings for various air temperatures the following arrangement may be adopted:—The tube $c$ $d$ is mounted in clips $c'$ which only hold it by friction so that when required it can be slid slightly up or down. A scale C is fixed on the support $e$ while a scale D is marked on the leg $d$ adjacent to the scale C. The scale C has equal divisions marked from say 20° to 120°. These may be any arbitrary size but it is preferred that they are each more than the total sliding movement required (about $\frac{1}{4}''$ for 100° with oil with a liquid column of the length shown). The degree indicating divisions of the scale D are then made each $\frac{1}{70}''$ longer than the divisions of scale C. Then if the fixed scales $p$ $q$ be set so that they are correct with the fluid surfaces at temperature 70° while the lines for 70° on scales C and D correspond a true correction is available upward and downward. For example if the temperature rises 10°, to 80° the fluid surfaces will be raised $\frac{1}{70}''$. On reference to Fig. 4 it will be seen that the 80° line on the scale D is $\frac{1}{70}''$ above the corresponding line on the scale C. By bringing the two lines together the necessary adjustment is made, and so on for any other temperature up or down.

The error as mentioned above is very slight and the inaccuracy due to expansion of the column of liquid may for most purposes be neglected.

A further convenient construction is illustrated in Figs. 5 to 7. In this case the supporting frame $u$ is made of sheet metal or the like and the bottle $h'$, containing the liquid for moistening the wet bulb is supported in a pocket formed by a plate $w$ having lugs $x$ passing through holes in the casing $u$. In this form the sliding piece $y$ bearing the scale $j$ may be of celluloid or other waterproof material and guided between the parallel legs $d$ and $c$ of the U tube, suitably curved lips $z$ being used for this purpose. A friction spring $o'$ as shown in Fig. 3 may also be employed for retaining the sliding index in position. This form is well suited for exposed places and the quantity of liquid contained in the bottle may be greater than in the form shown in Figs. 1 to 3 owing to the larger amount of space available for storing the bottle.

I prefer to scale these instruments by comparison with a standard wet and dry bulb instrument in a glass fronted closed chamber containing air artificially dried by any suitable means, say by chlorid of calcium or other agent. Or it may be done by running two streams of water of different but known temperatures concurrently on the two bulbs, and marking results.

Probably glass blowers will experience no difficulty in making and adjusting these instruments. One method is as follows:— The two bulbs are blown on the tube and a fine hair tube, say one or two inches in length, is drawn out from each and left open. The liquid is then introduced and when it is in the right position the ends of the hair tubes are sealed. Then the hair tubes are melted off near the bulbs, leaving the latter closed, and the liquid in proper position.

I claim:—

1. A wet and dry bulb hygrometer comprising two bulbs containing gas, means for wetting one of said bulbs, a U tube connecting said bulbs, said tube containing indicating liquid, a scale adjacent to said tube which by the surface of the liquid indicates the difference in temperature between the bulbs, and means for indicating the necessary amount for correcting the position of said scale according to slight changes caused by the expansion and contraction of the indicating liquid due to changes in temperature, substantially as hereinbefore set forth.

2. A wet and dry bulb hygrometer comprising two bulbs containing gas, means for wetting one of said bulbs, a U tube connecting said bulbs said tube containing an indicating liquid, a support for said tube, a sliding block bearing a scale adapted to indicate directly by the surface of the indicating liquid the difference in temperature between the bulbs, and means for guiding and holding said block between the legs of said U tube, substantially as and for the purpose hereinbefore set forth.

3. A wet and dry bulb hygrometer comprising two bulbs containing gas, a U tube connecting said bulbs and containing an indicating liquid, a support for said U tube, a bottle inset in said support, a fabric on one of said bulbs and having a wick depending in said bottle, and means for directly indicating by the surface of the indicating liquid in the U tube the difference of temperature between the said bulbs, substantially as and for the purpose hereinbefore set forth.

4. A hygrometer comprising in combination a plurality of bulbs, means for wetting one of said bulbs, a U-tube connecting said bulbs, said tube containing an indicating liquid, a support for said tube, a sliding block adjacent said tube, a scale carried by said block, means for guiding said block, means for holding said block in position, and means for operating said block to cause it to slide between the legs of said U-tube.

In testimony whereof I have signed my name to this specification in the presence of two subscribing witnesses.

SAMUEL AUGUSTINE de NORMANVILLE.

Witnesses:
BLANCHE GARWOOD,
SYDNEY SMITH.